Figure 1:
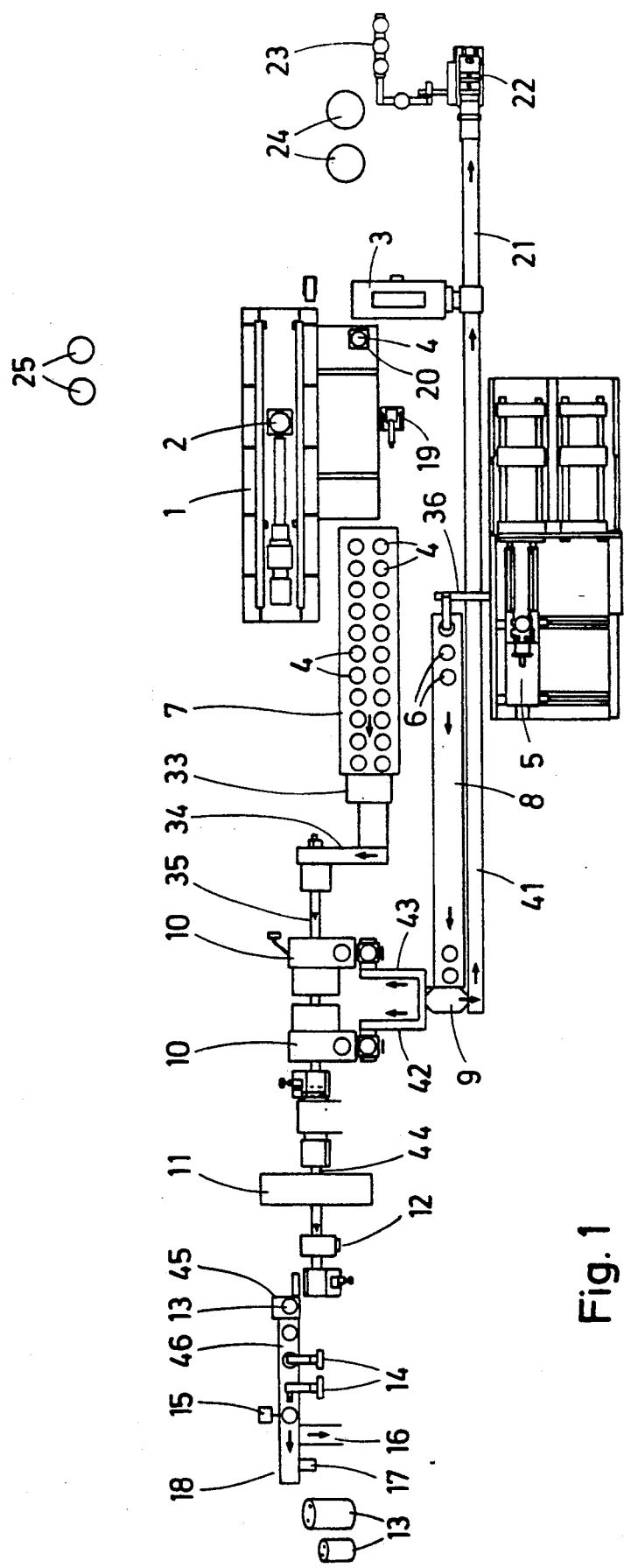

United States Patent [19]

Schutz

[11] Patent Number: 5,205,885

[45] Date of Patent: Apr. 27, 1993

[54] PROCESS AND APPARATUS FOR THE PRODUCTION OF TIGHTHEAD DRUMS AND WIDEMOUTH DRUMS

[76] Inventor: Udo Schutz, Ruckersteg 4, D-5418 Selters, Fed. Rep. of Germany

[21] Appl. No.: 732,758

[22] Filed: Jul. 19, 1991

[30] Foreign Application Priority Data

Jul. 19, 1990 [DE] Fed. Rep. of Germany ....... 4022926

[51] Int. Cl.$^5$ .................... B29C 45/03; B29C 45/16; B29C 49/04; B29C 49/18

[52] U.S. Cl. .................................. 156/69; 156/245; 156/267; 156/498; 156/499; 156/500; 156/511; 156/516; 156/517; 156/521; 156/556; 264/520; 264/523; 264/524; 264/527; 264/528; 264/531; 264/536; 264/537; 220/320; 220/649

[58] Field of Search ................. 156/69, 245, 256, 258, 156/267, 498, 499, 511, 516, 517, 521, 556, 500; 53/140, 561; 264/520, 523, 524, 527, 528, 536, 537; 425/522, 527, 531, 533, 542, 552; 220/320, 649

[56] References Cited

U.S. PATENT DOCUMENTS

| | | | |
|---|---|---|---|
| 3,196,593 | 7/1965 | Hey ........................................ | 53/561 |
| 3,432,586 | 3/1969 | Stenger . | |
| 3,454,690 | 7/1969 | Anderson et al. ................... | 425/527 |
| 3,457,590 | 7/1969 | Dittmann ............................. | 264/527 |
| 3,862,698 | 1/1975 | Hafele .................................. | 264/527 |
| 4,201,306 | 5/1980 | Dubois et al. ....................... | 156/69 |
| 4,412,628 | 11/1983 | Whitney .............................. | 220/649 |
| 4,548,668 | 10/1985 | Roth et al. .......................... | 156/556 |

FOREIGN PATENT DOCUMENTS

| | | | |
|---|---|---|---|
| 887814 | 7/1981 | Belgium . | |
| 278402 | 8/1988 | European Pat. Off. ............ | 264/531 |
| 3737884 | 6/1989 | Fed. Rep. of Germany . | |
| 2391056 | 1/1979 | France ................................ | 264/531 |

*Primary Examiner*—Caleb Weston
*Attorney, Agent, or Firm*—Young & Thompson

[57] ABSTRACT

A process for the production of tighthead drums having dimensional stability of the injection molded lids and blow molded drum bodies, comprises blow molding double drum bodies from plastic and centrally separating them into two drum bodies. Tighthead lids are produced by injection molding from plastic. The tighthead lids are then welded to the drum bodies. Widemouth drums are also produced by blow molding double drum bodies from plastic and centrally separating them into two drum bodies, but with a molded-on edge at a distance under the drum opening. Drum lids are injected molded from plastic with an outside flange molded-on the lower lid edge. A sealant of plastic is injected into the lids and the lids are positioned on the drum bodies sealed with a clamping ring.

15 Claims, 4 Drawing Sheets

PROCESS AND APPARATUS FOR THE PRODUCTION OF TIGHTHEAD DRUMS AND WIDEMOUTH DRUMS

The invention relates to the production of tighthead drums and widemouth drums from thermoplastic.

Setting of lids, injection molded from plastic, which are stored temporarily, on drum bodies blow molded from plastic, in the production of widemouth drums is often connected with difficulties, since lids and drum bodies do not fit together exactly because of dimensional deviations of the plastic parts dependent on different factors occurring in the plastic processing, particularly the different shrinking of the plastic parts in cooling after blow molding and injection of the parts.

The problem of deficient dimensional stability of the plastic parts to be connected to one another also occurs in the production of tighthead drums from plastic, in which the blow molded drum jacket is welded to the tighthead lid and bottom, which are produced in injection molding machines and stored temporarily.

The deficient dimensional stability of the plastic parts leads in the production of tighthead drums and widemouth drums to a relatively high rejection rate. A further disadvantage in the production of tighthead drums and widemouth drums from plastic can be seen in the deficient production flow, caused by the temporary storage of the lids and bottoms, which leads to an increase of production cost by the necessary storage space and the necessary internal or interplant transport of the lids and bottoms from the injection molding machines to the storage and from there to the production site of the drum bodies. The separate injection molding of the bottoms increasing the cost of the product is considered another disadvantage in the production of tighthead drums.

The object of the invention is to develop processes for the production of tighthead drums and widemouth drums from plastic, which guarantee a dimensional stability of the injection molded lids and blow molded drum bodies, and to provide units with higher production output operating according to these processes.

This object is achieved according to the invention by a process for the production of tighthead drums, which is characterized by blow molding of double drum bodies from plastic and central separation of them into two drum bodies, the injection molding production of tighthead lids from plastic, cooling of the drum bodies and the tighthead lids on a skeleton form in the cooling and calibrating sections, which are placed downstream from the blow molding machine for the production of the double drum bodies and the injection molding machine for the drum lids and the welding of the tighthead lids to the drum bodies.

A further essential product feature of the tighthead drum production consists in the fact that the tighthead lids are injection molded with an excess of the lower lid edge and that, after running through the cooling and calibrating section, the annular section of the lower lid edge projecting over the nominal height measurement of the lids is cut off for the preparation of a welding surface on the lower lid edge without an oxide skin being formed in the injection molding of the lids.

After welding of the tighthead lid and drum body the welding seam area is heated to remove the welding stresses by flame treatment.

The process provided for obtaining the object of the invention for the production of widemouth drums provides blow molding of double drum bodies from plastic and central separation of them into two drum bodies with a molded-on edge each at a distance under the drum opening, the injection molding production of drum lids from plastic with an outside flange molded-on the lower lid edge, the cooling of the drum bodies and the drum lids on a skeleton form in the cooling and calibrating sections, which are placed downstream from the blow molding machine for the production of double drum bodies and the injection molding machine for the drum lids, the injection of a sealant of plastic into the lids and setting the lids on the drum bodies and sealing of the lids with a clamping ring.

The central idea of the invention can be seen in the downstream cooling and calibrating sections in the two processes for the production of tighthead drums and widemouth drums in the cooling of the drum bodies and the drum lids on a skeleton form in the blow molding machine for the production of the double drum bodies and the injection molding machine for the drum lids. This production measure in the framework of a continuous production process provides the prerequisite for the precise welding of tighthead lids and drum bodies in the tighthead drum production and a exactly fitting setting of the lids on the drum bodies in the production of widemouth drums, provides for a considerable quality improvement of the drums and lowers the rejection rate to a minimum. Blow molding of the double drum bodies and the linking drum body and lid production in a continuous production process without a temporary storage of the drum bodies or lids leads to a substantial production increase in comparison with the known production processes for widemouth drums and tighthead drums and a reduction of the production costs by the saving of personnel and storage room and by the unnecessary transport of the parts to the temporary storage and from there to the end production.

Figure 2:
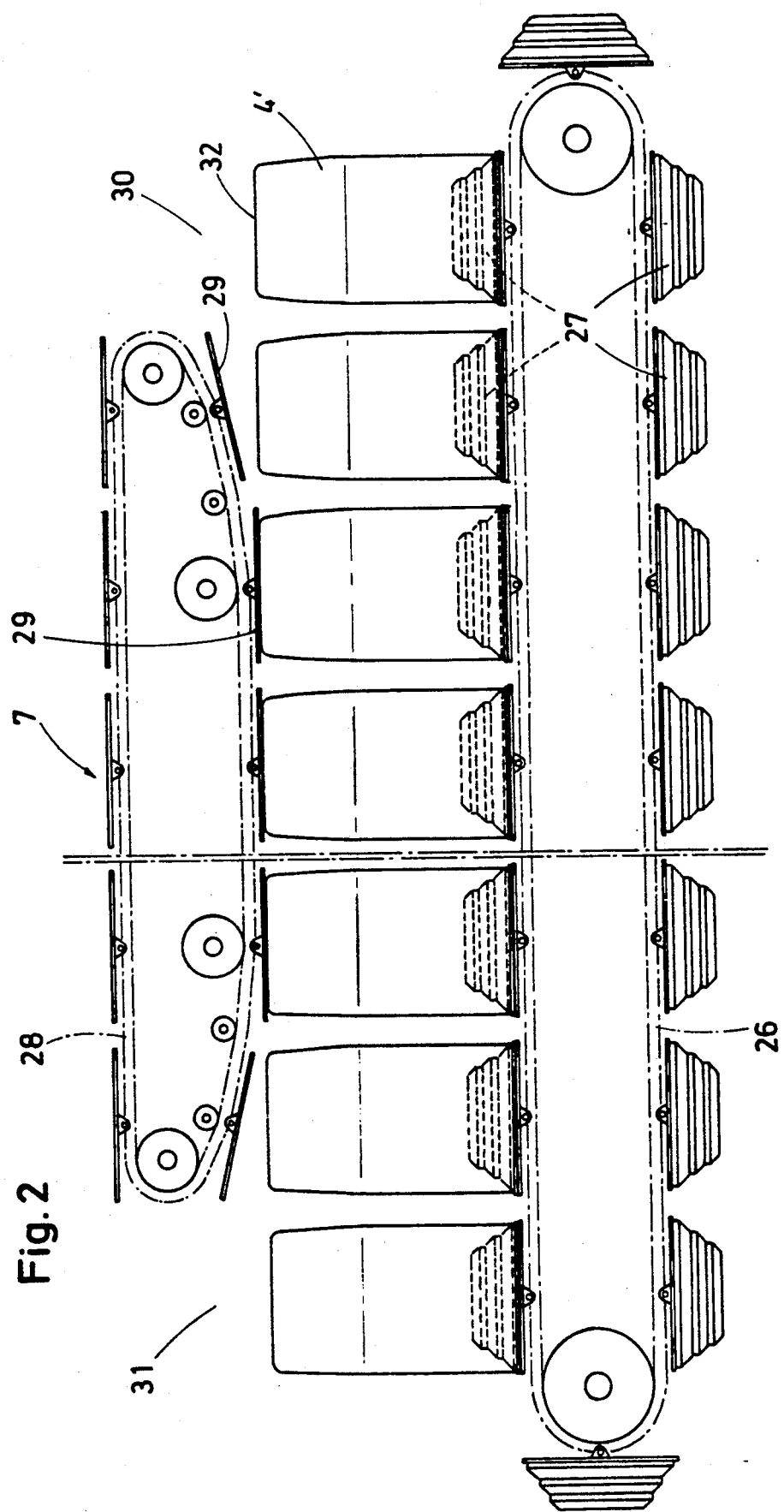
Figure 3:
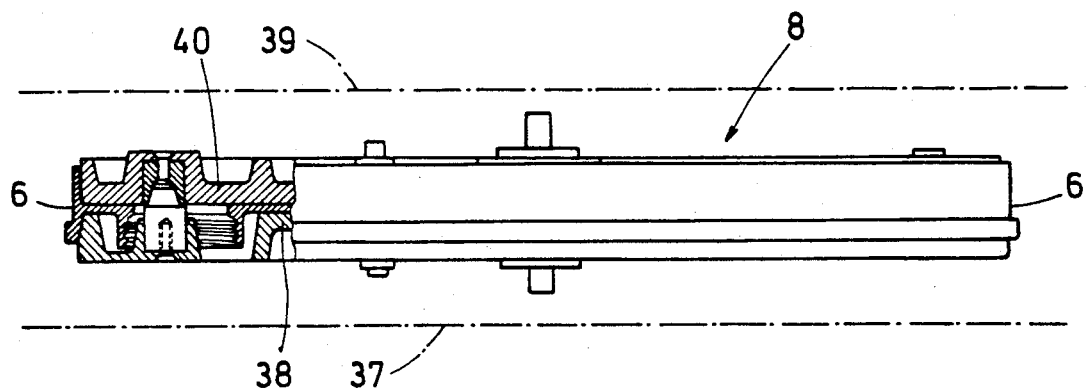
Figure 4:
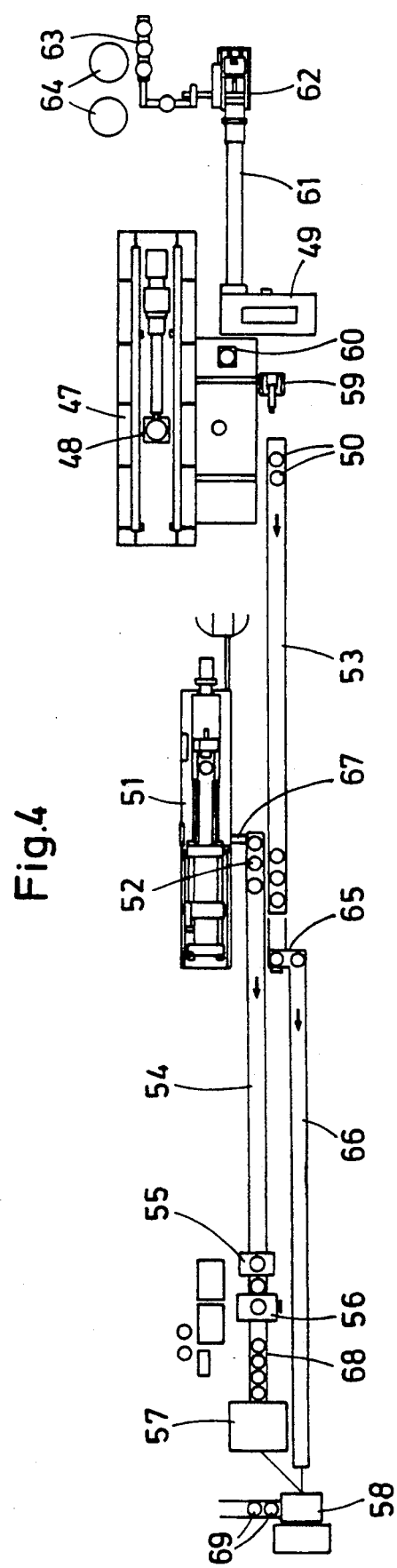

The invention is explained below in greater detail by two units for the production of tighthead drums and widemouth drums from plastic. There are shown in diagrammatic representation in:

FIG. 1, a horizontal projection of a unit for the production of tighthead drums, FIG. 2, the cooling and calibrating section for the drum bodies of the unit according to FIG. 1, FIG. 3, a sectionally enlarged representation of the cooling and calibrating section for the tighthead lids of the unit according to FIG. 1 and FIG. 4, a horizontal projection of a unit for the production of widemouth drums.

The main components of the unit according to FIGS. 1 to 3 for the production of tighthead drums are a machine 1 for blow molding of double drum bodies 2 from plastic, a cutting device 3 for central separation of double drum bodies 2 into two drum bodies 4 from plastic, an injection molding machine 5 for the production of tighthead lids 6, cooling and calibrating sections 7, 8 for drum bodies 4 and tighthead lids 6 downstream from blow molding machine 1 and injection molding machine 5, a processing machine 9, following cooling and calibrating section 8 for tighthead lids 6, for cutting accurate to size of the lower lid edge and cutting off of the flash of the injection molding in injection molding machine 5, two welding machines 10 for welding tighthead lids 6 to drum bodies 4, a machine 11 for processing the welding seam, a device 12 for heating the welding seam area of tighthead drums 13 by a flame, a device 14 for testing the sealing of tighthead drums 13, a marking device 15, a crosswise conveyor 16 for removal of the defective tighthead drums, a packaging device 17 and a conveyor belt removal station 18.

Double drum bodies 2, produced in blow molding machine 1 from plastic granular material, are transported by a robot 19 to cutting device 3, in which double drum bodies 2 are divided into two equal drum bodies 4, by cutting out of a central ring, which contains the blowing opening of the inserted blowing mandrel. Drum bodies 4 are brought by robot 19 from cutting device 3 to a weighing device 20. Overweight drum bodies are sorted out and delivered by robot 19 to a conveyor belt 21, which feeds to a cutting mill 22 the overweight drum bodies together with rings accumulating as scrap in cutting device 3, and conveyor belt 21 serves as cooling section for the scrap accumulating with temperatures of 60° to 70° C. A suction device 23 conveys the granular material produced in cutting mill 22 into a grinding stock silo 24. The grinding stock from silo 24 is mixed with fresh granular material from raw material silo 25, and the granular material mixture is fed to blow molding machine 1. Robot 19 brings drum bodies 4 with the prescribed weight to cooling and calibrating section 7.

Cooling and calibrating section 7 according to FIG. 2 exhibits a lower endless conveyor 26 with cooling and calibrating bases 27 to receive drum bodies 4 in head position 4' and an upper endless conveyor 28 with pressure plates 29 for holding drum bodies 4 on calibrating bases 27, and endless conveyors 26, 28 are designed as chain conveyors. Lower endless conveyor 26 is moved up in feeding area 30 and removal area 31 by the ends upper endless conveyor 28 so that in feeding area 30 enough room is available for robot 19 for a drum body 4 to be set in head position 4' on a calibrating base 27 before a pressure plate 29 of upper endless conveyor 28 is placed on drum bottom 32. In the same way in removal area 31 room is available for a removal and turnover device 33, to lift a drum body after running through cooling and calibrating section 7 and release of the drum body by the respective pressure plate 29 resting on drum bottom 32 of upper endless conveyor 28 from calibrating base 27 and to deliver drum body 4 lying with longitudinal axis pointing in the conveying direction to a crosswise conveyor 34. A longitudinal conveyor 35, designed as a chain conveyor, takes over drum body 4, now lying crosswise to the conveying direction from crosswise conveyor 34 and transports it to two successively placed hot-tool welding machines 10.

Drum bodies 4 entering with a jacket temperature of about 50°-60° C. into cooling and calibrating section 7 are cyclically conveyed over a period of about 30 minutes from holding station to holding station through cooling and calibrating section 7 and cooled to room temperature. Drum bodies 4 are blow molded on with cooling air in the successively placed holding stations. In this case, the heat removal from the drum bodies is preponderantly brought about by convection and heat dissipation by calibrating base 27 and pressure plates 29 made from aluminum with a high heat transfer coefficient. By cooling of drum bodies 4 on calibrating bases 27 it is achieved that the diameter of the opening edge of drum bodies 4, leaving cooling and calibrating section 7, corresponds to the diameter of the lower edge of tighthead lids 6 injection molded in injection molding machine 5, after they have run through cooling and calibrating section 8 placed downstream from injection molding machine 5.

The design and mode of operation of cooling and calibrating section 8, to which tighthead lids 6 injection molded in injection molding machine 5 will be delivered by a robot 36, are analogous to the design and mode of operation of cooling and calibrating section 7 for drum bodies 4. Cooling and calibrating section 8 according to FIG. 3 exhibits a lower endless conveyor 37 with lower cooling and calibrating plates 38 and an upper endless conveyor 39 with upper cooling and calibrating plates 40 for clamping of tighthead lids 6. Endless conveyors 37, 39 are designed as chain conveyors. Cooling and calibrating plates 38, 40 are produced from aluminum.

In processing machine 9, following cooling and calibrating section 8, the flash—originating from the injection molding—of tighthead lids 6 and the annular section of the lower lid edge projecting over the nominal height measurement of the tighthead lids of the lids injection molded with an excess for the preparation of a welding surface on the lower lid edge without an oxide skin being formed in the injection molding of the lids are cut off. Flash and rings are conveyed with a conveyor belt 41 to a conveyor belt 21 and are conveyed by the latter, together with the scrap accumulating in blow molding and separating of double drum bodies 2, to cutting mill 22.

Two overhead linear robots 42, 43 transport tighthead lids 6 from processing machine 9 to the two hot-tool welding machines 10, in which tighthead lids 6 are welded precisely suitably to drum bodies 4 coming from cooling and calibrating section 7.

In welding of the lower, lid edge, free of oxide skin, to opening edge, free of oxide skin, of the drum bodies obtained by the separation of double drum bodies 2 in cutting device 3 a homogeneous welding seam is formed with high creep resistance limit and stress cracking resistance.

There is the possibility of providing buffer zones for drum bodies 4 and tighthead lids 6 before hot-tool welding machines 10.

A longitudinal conveyor 44, designed as a chain conveyor, transports tighthead drums 13 from hot-tool welding machines 10 to processing machine 11, which cuts off the projecting welding seam of the tighthead drums, and from there by device 12 to heating of the welding seam area of the tighthead drums by a flame to eliminate welding stresses to a turnover device 45, which delivers the tighthead drums in upright position to another longitudinally directed conveyor belt 46.

Conveyor belt 46 further transports tighthead drums 13 to testing device 14, in which the drums are tested for tightness, from there to marking device 15, in which the drums receive a continuous production number and a company emblem, past the crosswise conveyor 16 for removal of defective drums to packaging device 17, in which the bungs are sealed with threaded plugs and drums optionally further equipped to customer specifications and from there to removal station 18 at the end of conveyor belt 46.

The completed tighthead drums, before shipment to the customer, are preferably placed on pallets in a palletizing device (not shown), which, as needed, can be packaged together in a following stretching device (also not shown) into units of several pallets.

The main components of the unit according to FIG. 4 for the production of the widemouth drums are a machine 47 for the blow molding of double drum bodies 48 from plastics, a cutting device 49 for central separation of double drum bodies 48 into two drum bodies 50 with one molded-on edge each at a distance below the drum opening, an injection molding machine 51 for the production of drum lids 52 from plastic, cooling and calibrating sections 53, 54 placed downstream from blow molding machine 47 and injection molding machine 51 for drum bodies 50 and drum lids 52, a machine 55 for separation of the flash from drum lids 52, a machine 56 for injecting a plastic sealant into lids 52 and placed downstream from it a drying device 57 as well as an assembly stand 58 for setting lids 52 on drum bodies 50 and sealing the lids with a clamping ring. In the production of the widemouth drums with Inliners, drum bodies 50 on assembly stand 58 are equipped with a flexible Inliner made from plastic sheet or a metal-plastic compound sheet.

Double drum bodies 48, produced from plastic granular material in blow molding machine 47 are transported by a robot 59 to cutting device 49, in which double drum bodies 48 are separated into two equal drum bodies 50. Drum bodies 50 are brought from cutting device 49 to weighing device 60 by robot 59. Overweight drum bodies are sorted out and delivered by robot 59 to a conveyor belt 61, which feeds the overweight drum bodies together with plastic rings accumulating in cutting device 49 to a cutting mill 62. A suction device 63 conveys the granular material produced in cutting mill 62 to grinding stock silo 64 for further processing in mixing it with fresh granular material. Robot 59 brings drum bodies 50 with the prescribed weight to cooling and calibrating section 53, whose design and mode of operation corresponds to the design and mode of operation of cooling and calibrating section 7 of the above-described unit for the production of tighthead drums.

After running through cooling and calibrating section 53 drum bodies 50 are delivered from a removing and turnover device 65 to a conveyor belt 66, which brings the drum bodies to assembly stand 58.

Lids 52 leaving injection molding machine 51 are taken over by a robot 67 and fed to cooling and calibrating section 54, which corresponds to cooling and calibrating section 8 of the above-described unit for the production of tighthead drums. In processing machine 55, following cooling and calibrating section 54, the flash molded on lids 52 is cut off, which, together with scrap produced in cutting device 49 and the rejected drums from blow molding machine 47, is conveyed to cutting mill 62. From processing machine 55 drum lids 52 are conveyed to injection molding machine 56, with which a two-component plastic sealant is injected into the lids. From injection molding machine 56 the lids are conveyed with a conveyor belt 68 into drying device 57, in which the reaction between the plastic sealant and an incorporated hardening agent started on the conveying path between the injection molding machine and the drying device is completed. On assembly stand 58 drum lids 52 taken from drying device 57 are set on drum bodies 50—optionally after mounting an Inliner—and the drum lids are closed with a clamping ring.

Completed widemouth drums 69 are palletized after marking, and the pallets with the drums can be packaged, as needed, into units of several pallets.

What is claimed is:

1. In a process for the production of barrels from thermoplastic synthetic resin wherein a closed cylindrical twin body of an extruded tubular preform is blow-molded in a blowing mold, removed from the mold, and divided into two barrel bodies by cutting out a central ring which latter contains the blow opening of a shot-in blow mandrel; the improvement comprising manufacturing bunghole lids from plastic by injection molding in an injection mold, cooling the barrel bodies and the bunghole lids to a mutually fitting shape while moving the bodies and lids along cooling and calibrating paths arranged downstream of the blowing mold and the injection mold, and welding the bunghole lids to the barrel bodies to obtain bunghole barrels.

2. Process according to claim 1, wherein the tighthead lids are injection molded with an excess of a lower lid edge and wherein, after cooling, an annular section of the lower lid edge projecting over a nominal height measurement of the lids is cut off for the preparation of a welding surface on the lower lid edge.

3. Process according to claim 1, wherein after welding of the tighthead lids and drum bodies the welding area is heated to remove welding stresses.

4. Process according to claim 3, wherein said heating is effected by a flaming of the welding area of the tighthead drums.

5. In a process for the production of barrels from thermoplastic synthetic resin wherein a closed cylindrical twin body of an extruded tubular preform is blow-molded in a blowing mold, removed from the mold, and divided into two barrel bodies by cutting out a central ring which latter contains the blow opening of a shot-in blow mandrel; the improvement comprising producing by injection molding in an injection mold barrel lids of a synthetic resin with an outer flange molded to a lower lid rim, cooling the barrel bodies and the barrel lids to a mutually fitting shape while moving the bodies and lids along cooling and calibrating paths arranged downstream of the blowing mold and the injection mold, injecting a sealing compound of a synthetic resin into the lids, and placing the lids onto the barrel bodies, in contact with a border molded at a spacing below the barrel opening, and closing the lids with a clamping ring.

6. Process according to claim 5 for the production of widemouth drums with liners, comprising mounting a flexible liner made from plastic sheet or a metal-plastic composite sheet in the drum bodies before setting the lids thereon.

7. Apparatus for the production of tighthead drums, comprising a machine (1) for blow molding double drum bodies (2) from plastic, a cutting device (3) for centrally separating said each of said double drum bodies (2) into two drum bodies (4), an injection molding machine (5) for the production of tighthead lids (6) from plastic, a processing machine (9) for cutting accurately to size a lower lid edge and cutting off of the flash from the injection molded lids, a welding machine (10) for welding the tighthead lids (6) to the drum bodies (4), and means (12) for heating the welding seam area of tighthead drums (13).

8. Apparatus according to claim 7, further comprising a cooling and calibrating section (7) for drum bodies (4), having a lower endless conveyor (26) with cooling and calibrating bases (27) to receive drum bodies (4) in head position (4') and an upper endless conveyor (28) with pressure plates (29) for holding drum bodies (4) on calibrating bases (27).

9. Apparatus according to claim 7, further comprising a cooling and calibrating section (8) for drum lids (6), having a lower endless conveyor (37) with lower cooling and calibrating plates (38) and an upper endless conveyor (39) with upper cooling and calibrating plates (40) for clamping lids (6).

10. Apparatus according to claim 8, wherein the lower endless conveyor (26) of the cooling and calibrating section (7) is pulled up in a feeding area and removal area (30) by the ends of the upper endless conveyor (28).

11. Apparatus according to claim 8, wherein the endless conveyors (26, 28) are chain conveyors.

12. Apparatus according to claim 9, wherein the lower endless conveyor (37) of the cooling and calibrating sections (8) is pulled up in a feeding area and removal area (31) by the ends of the upper endless conveyor (39).

13. Apparatus according to claim 9, wherein the endless conveyors (37, 39) are chain conveyors.

14. Apparatus for the production of widemouth drums, comprising a machine (47) for blow molding double drum bodies (48) from plastics, a cutting device (49) for centrally separating each of said double drum bodies (48) into two drum bodies (50) each with one molded-on edge at a distance below a drum opening, an injection molding machine (51) for the production of drum lids (52) from plastic, cooling and calibrating sections (53, 54) for drum bodies (50) and drum lids (52), a machine (56) for injecting a plastic sealant into said lids (52) and a drying device (57) as well as an assembly stand (58) for setting lids (52) on drum bodies (50) and sealing the lids with a clamping ring.

15. Apparatus according to claim 14 for the production of widemouth drums with liners, including an assembly stand (58) for providing drum bodies (50) with a flexible liner made from plastic sheet or a metal-plastic composite sheet.

* * * * *